(12) United States Patent
Peltier et al.

(10) Patent No.: US 10,974,376 B2
(45) Date of Patent: Apr. 13, 2021

(54) DEVICE TO INSTALL A RING OF A PLANETARY GEAR TRAIN

(71) Applicant: SAFRAN TRANSMISSION SYSTEMS, Colombes (FR)

(72) Inventors: Jordane Peltier, Paris (FR); Alexis Dombek, Genainville (FR); Jamal Goudar, Argenteuil (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 215 days.

(21) Appl. No.: 15/762,201

(22) PCT Filed: Sep. 22, 2016

(86) PCT No.: PCT/FR2016/052404
§ 371 (c)(1),
(2) Date: Mar. 22, 2018

(87) PCT Pub. No.: WO2017/055713
PCT Pub. Date: Apr. 6, 2017

(65) Prior Publication Data
US 2018/0290278 A1 Oct. 11, 2018

(30) Foreign Application Priority Data

Sep. 30, 2015 (FR) ...................................... 1559272

(51) Int. Cl.
*B25B 27/14* (2006.01)
*F16H 57/08* (2006.01)
(Continued)

(52) U.S. Cl.
CPC ........... *B25B 27/14* (2013.01); *F16H 57/023* (2013.01); *F16H 57/08* (2013.01);
(Continued)

(58) Field of Classification Search
CPC . B25B 27/14; F16H 57/08; F16H 2057/0062; F16H 57/023; F02C 7/36;
(Continued)

(56) References Cited

U.S. PATENT DOCUMENTS 4,202,539 A * 5/1980 Polastri ................. B23Q 1/527
269/287
4,716,271 A * 12/1987 Hulsizer .............. B23Q 9/0021
219/125.11
(Continued)

FOREIGN PATENT DOCUMENTS

CN 204115684 U * 1/2015 ............. G01B 17/02
CN 104373517 A 2/2015
(Continued)

OTHER PUBLICATIONS

International Search Report as issued in International Patent Application No. PCT/FR2016/052404, dated Feb. 3, 2017.

*Primary Examiner* — Lee D Wilson
*Assistant Examiner* — Mahdi H Nejad
(74) *Attorney, Agent, or Firm* — Pillsbury Winthrop Shaw Pittman LLP

(57) ABSTRACT

A device for mounting a ring gear of an epicyclic gear train, the ring gear including a front ring gear and a rear ring gear, the device including: a plurality of longitudinal guides; a front mounting forming a portion of circle, including: at least two holes for passing the guides; a plurality of first system for supporting and rotating the front ring gear relative to the axis thereof, movable between a first position in which the front ring gear is supported and can rotate relative to the axis thereof and a second position in which the front ring gear is not supported; a rear mounting forming a portion of circle, including: at least two holes for passing the guides; and a plurality of second system for supporting and rotating the rear ring gear relative to the axis thereof, (Continued)

movable between a third position in which the rear ring gear is supported and can rotate relative to the axis thereof and a fourth position in which the rear ring gear is not supported.

5 Claims, 4 Drawing Sheets

(51) Int. Cl.
*F16H 57/023* (2012.01)
*F02C 7/36* (2006.01)
*B23B 31/12* (2006.01)
*F16H 57/00* (2012.01)

(52) U.S. Cl.
CPC ............. *B23B 31/1261* (2013.01); *F02C 7/36* (2013.01); *F05D 2260/40311* (2013.01); *F16H 2057/0062* (2013.01); *Y10T 279/18* (2015.01)

(58) Field of Classification Search
CPC ... B25H 1/00; B25H 1/10; F05D 2260/40311; B23P 11/00; B23P 15/00; B23P 19/00; B23Q 1/00; B23Q 1/25; B23Q 3/00; B23Q 3/06; E02D 13/04; B23B 31/16; Y10T 279/19; Y10T 279/18

USPC ...... 29/255, 252, 258, 271, 281.1; 269/48.1; 279/106

See application file for complete search history.

(56) References Cited

U.S. PATENT DOCUMENTS

| | | | | |
|---|---|---|---|---|
| 5,282,403 | A * | 2/1994 | Rouleau | B23B 31/1269 82/127 |
| 5,421,623 | A * | 6/1995 | Cassin | F16L 21/00 285/343 |
| 6,168,427 | B1 * | 1/2001 | Cho | C30B 35/005 118/725 |
| 6,386,789 | B1 * | 5/2002 | Chausse | F16B 21/165 403/322.2 |
| 8,939,714 | B1 | 1/2015 | McCune et al. | |
| 2005/0081685 | A1 * | 4/2005 | Ernesti | B25B 13/46 81/60 |
| 2013/0214497 | A1 * | 8/2013 | Yoshida | H01L 21/68728 279/131 |

FOREIGN PATENT DOCUMENTS

JP         08092958 A  *  4/1996
WO    WO 2013/124590 A1    8/2013

* cited by examiner

DEVICE TO INSTALL A RING OF A PLANETARY GEAR TRAIN

CROSS-REFERENCE TO RELATED APPLICATIONS

This is the U.S. National Stage of PCT/FR2016/052404, filed Sep. 22, 2016, which in turn claims priority to French Application No. 1559272, filed Sep. 30, 2015, the entire contents of all applications are incorporated herein by reference in their entireties.

TECHNICAL FIELD OF THE INVENTION

The invention relates to a device to install a ring of a planetary gear train, more specifically a herringbone planetary gear train.

STATE OF THE PRIOR ART

A planetary gear train is a system enabling power to be transmitted to a mechanical shaft. In the case of a planetary gear train for a turbomachine the input line comes from the turbomachine's engine. A planetary gear train is intended to reduce the rotational speed of the engine whilst transmitting the torque. In this case the speeds and torques are very high, and high-power epicyclic reduction gear assemblies are required. In a turbomachine planetary gear trains are used in particular as speed reducers to reduce the rotational speed of the fan's rotor, independently of the rotational speed of the turbine.

As illustrated in FIGS. 1A and 1B, an epicyclic reduction gear assembly 1 contains a planet-carrier tool 11. The planet-carrier has several positions 111 of a first type for planet gears 112, which are the gears around the reduction gear. In the centre of the reduction gear is a second type of position 113 for a central gear called the sun gear.

Planet gears of this type of gear train contain herringbone teeth 1121, i.e. teeth at an angle relative to the planet gear's rotational axis. This type of gear tooth enables the axial loads to be balanced. Since the teeth are herringbone teeth it is necessary for assembly that one of the gear train's meshing elements consists of two separate portions.

Reduction gear 1 thus contains a ring consisting of a first half-ring, called the front ring, 21, and of a second-half-ring, called the rear ring, 22. The front ring and the rear ring contain teeth 23 on their peripheries enabling them to be securely attached to one another when they are in contact, and enabling them by this means to form the ring of the reduction gear. As regards the assembly of the front ring and of the rear ring to form the ring, a fitted centring is performed, the result of which can be seen in FIG. 1C.

This shows front ring 21 and rear ring 22 containing teeth, with the assembly fitted. To this end the front ring and the rear ring must be rotated around their respective rotational axes, bearing in mind that each weighs at least some fifteen kilos; and they must be advanced axially relative to one another so that they become engaged in the planet gears, and then be fitted and aligned angularly with one another until the final contact between the teeth.

DESCRIPTION OF THE INVENTION

The invention seeks to remedy all or a proportion of the disadvantages of the state of the art identified above, and in particular to propose means enabling the elements comprising a ring of a reduction gear with a planetary gear train to be handled and held in place in order to install it.

In this illustration one aspect of the invention relates to a device for installing a ring of a planetary gear train, where the said planetary gear train extends in a first axis, where the said ring includes a front ring and a rear ring, and where the said device contains:

a plurality of longitudinal guides, where each guide extends in a direction parallel to the first axis;
a front bracket having the shape of an arc of a circle for the front ring, where the said front bracket contains:
at least two holes allowing the guides to pass through;
a plurality of first means of holding the front ring and of rotating it around its axis, where the said first holding and rotation means can move between a first position in which the front ring is held, and can rotate around its axis, and a second position in which the front ring is not held in place;
a rear bracket having the shape of an arc of a circle for the rear ring, where the said rear bracket contains:
at least two holes allowing the guides to pass through;
a plurality of second means of holding the rear ring and of rotating it around its axis, where the said second holding means can move between a third position in which the rear ring is held, and can rotate around its axis, and a fourth position in which the rear ring is not held in place.

The installation device according to the invention thus enables assembly of the front and rear rings to be facilitated, and enables them to be installed with the planet gears of a planet-carrier. The rings can indeed be held in place using the guides, and the front and rear brackets. They can move laterally along the guides using the holes in the front and rear brackets. And they are held in place due to the first and second holding and rotational means, which also enable the rings to rotate easily around their respective axes. This installation device thus enables the handling and installation of a ring of a planetary gear train to be facilitated for an operator.

In addition to the main characteristics mentioned in the preceding paragraph, the method/device according to the invention may have one or more of the following possible additional characteristics, considered individually or in technically possible combinations.

Advantageously, the plurality of first holding means contain:
two adjustable rollers, where the said adjustable rollers contain a pin to attach the roller to the front bracket, where the length of the said pin is adjustable and where a ball lock pin enables the said adjustable rollers to be moved from the first position to the second position; and
two simple rollers, where the said simple rollers contain a spring and a ball lock pin enabling the said simple rollers to be moved from the first position to the second position, and where the said springs are designed to press the roller against the front ring in the first position.

Advantageously, the plurality of second holding means contain:
two adjustable rollers, where the said adjustable rollers contain a pin to attach the roller to the rear bracket, where the length of the said pin is adjustable and where a ball lock pin enables the said adjustable rollers to be moved from the third position to the fourth position;
a simple roller, where the said simple roller has a spring and a ball lock pin enabling the said simple roller to be moved from the third position to the second position, and where the said spring is designed to press the roller against the rear ring in the third position; and a groove and a retaining bracket, where the said retaining bracket contains a first end designed to work in tandem with the groove, where the said first end moves in the groove and a second end is designed to work in tandem with the rear ring to hold the rear ring in place.

Advantageously, at least two guides of the plurality of guides each contains:

a sleeve tube including a first end and a second end;

a first guide portion, where a third end of the first portion is designed to be inserted in the first end of the sleeve tube;

a second guide portion, where a fourth end of the second portion is designed to be inserted in the second end of the sleeve tube;

where each sleeve tube is connected to the other sleeve tube by means of a support element, where the said support element contains a stand designed to rest on a surface.

Advantageously, the device contains a guide pin, where the said pin contains a longitudinal tube designed to be inserted simultaneously through a first hole of the front ring and a second hole of the rear ring.

BRIEF DESCRIPTION OF THE FIGURES

Other characteristics and advantages of the invention will be seen clearly on reading the description below, with reference to the appended figures, which illustrate.

For greater clarity, identical or similar elements are identified by identical reference signs in all the figures.

DETAILED DESCRIPTION OF ONE EMBODIMENT

Figure 1A:
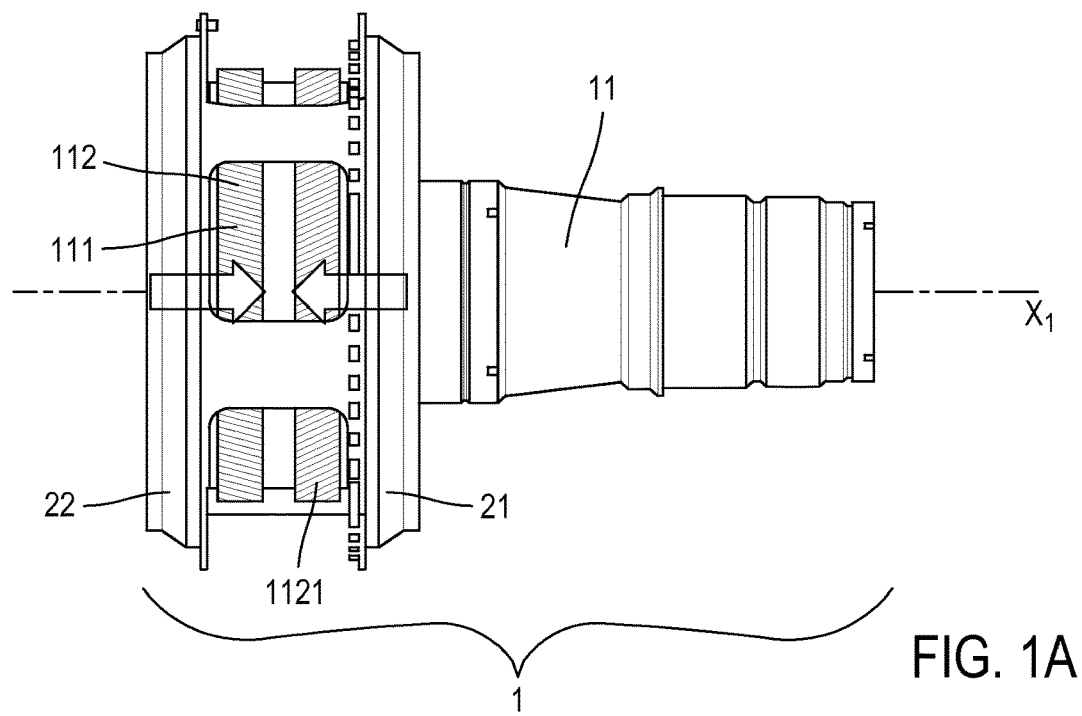
FIG. 1A, a diagrammatic view of a planetary gear train.
Figure 1B:
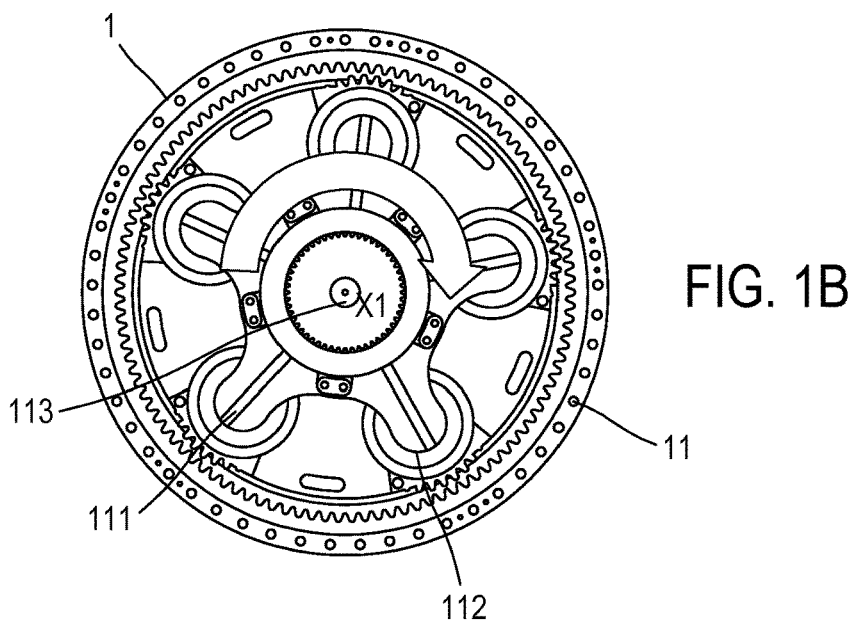
FIG. 1B, a front view of the train of FIG. 1.
Figure 1C:
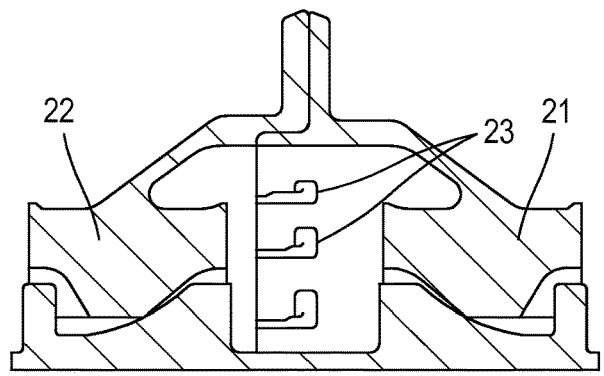
FIG. 1C, a cross-section view of a front ring and of a rear ring of the train of FIG. 1.
Figure 2:
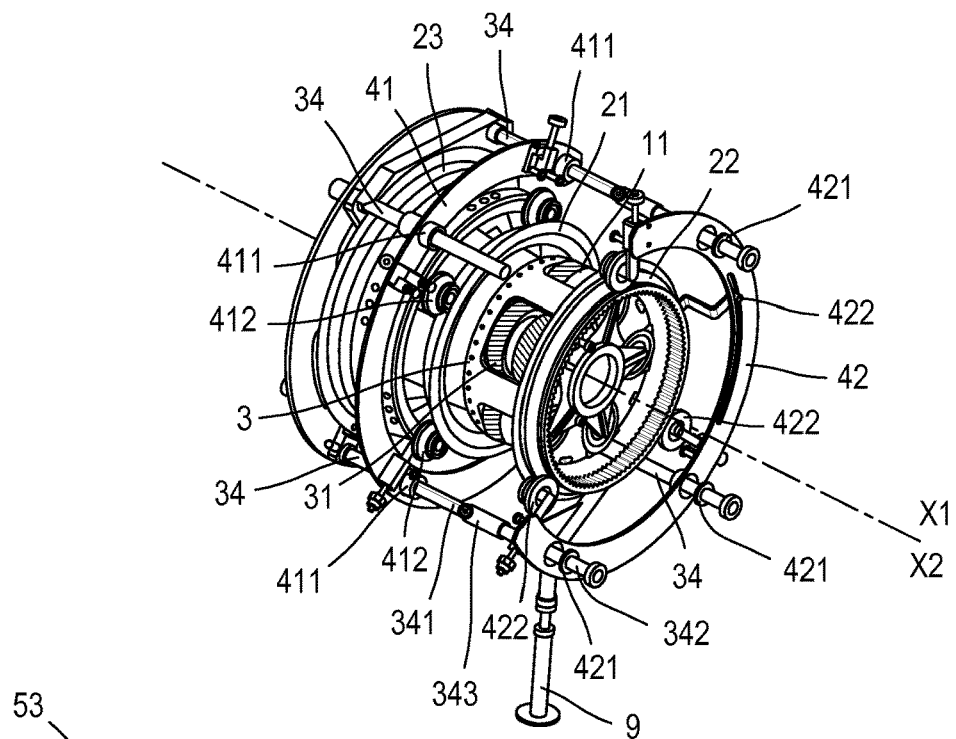
FIG. 2, a diagrammatic view of an assembly jig for installing a planetary gear train and of a device for installing a ring of a train according to one embodiment of the invention.

FIG. 2 illustrates a planetary gear train extending in a first axis X1 in place in a planetary gear train mounting device. This planetary gear train mounting device contains an assembly jig 3 containing a hollow portion 31 extending in a second axis X2.

Hollow portion 31 receives a first portion of a planet-carrier 11 of a planetary gear train. The planet-carrier extends in a first axis X1 which is the same as second axis X2 in FIG. 2.

FIG. 2 also shows assembly jig 3 on to which ring-holder 23, front ring 21 and rear ring 22 have been installed. When a planetary gear train is assembled, the ring consisting of front ring 21 and rear ring 22 is assembled after the gear train has been assembled, after the planet gears and the sun gear have been inserted in the planet-carrier element. The ring-holder and the front ring must preferably be in place in the jig before assembly of the other elements of the planetary gear train starts, and in particular before the planet-carrier is inserted in the hollow portion of the assembly jig. Indeed, when the planet-carrier has been inserted in the hollow portion, the diameter of the portion of the planet-carrier where the planet gears are to be inserted is too great compared to that of the ring-holder and the rings. Thus, once the planet-carrier has been inserted in the jig it is no longer possible to insert the ring-holder and the front ring through the upper portion of the gear train. Inserting them through the lower portion of the gear train would require the previously assembled elements, i.e. the planet gears in the planet-carrier, to be brought out, which is difficult, dangerous operation for an operator. It is therefore particularly advantageous if the installation device can put the ring-holder and the front ring in place before inserting the planet-carrier and planet gear elements.

Assembly jig 3, used to assemble the planetary gear train, works in tandem with the installation device for installing a ring of the planetary gear train to assemble the various elements comprising the planetary gear train. It can therefore be seen in FIG. 2 that assembly jig 3 in this case contains four longitudinal guides 34 each of which extends in a direction parallel to first axis X1 in which the planetary gear train extends. The four guides 34 are positioned on the periphery of the assembly jig.

The planetary gear train ring mounting device contains a front bracket 41. Front bracket 41 contains four holes 411 (one of which is not visible) which enable the guides 34 to pass through them. Front bracket 41 can thus move laterally along guides 34.

Front bracket 41 has the shape of an arc of a circle, but is preferably not completely circular. Indeed, the space left enables an operator to gain access to the elements more easily, and in particular the front ring, than if front bracket 41 was completely circular. Front bracket 41 contains four first means 412 for holding and rotating the front ring around its axis, which is the same as first axis X1. In this embodiment first holding and rotation means 412 contain rollers which will be described in greater detail with reference to the following figures.

The planetary gear train mounting device contains a rear bracket 42. Rear bracket 42 contains three holes 421 which enable guides 34 to pass through. Rear bracket 42 can thus move laterally along guides 34. Rear bracket 42 has the shape of an arc of a circle, but is preferably not completely circular. Indeed, the space left enables an operator to gain access to the elements more easily, and in particular the rear ring, than if rear bracket 42 was completely circular. Rear bracket 42 contains four second means 422 for holding and rotating the rear ring around its axis, which is the same as first axis X1. In this embodiment second holding and rotation means 422 contain rollers and a groove and a retaining bracket, which will be described in greater detail with reference to the following figures.

The function of the front and rear brackets is to rigidify the device between the guides and to facilitate the lateral movement of the rings along the guides, ensuring that the rollers move, and that a roller does not remain in a position different to that of the other rollers.

The front and rear brackets, and therefore the front and rear rings, are supported by the guides in the assembly jig. Several of the device's guides contain a first guide portion 341, a second guide portion 342 and a sleeve tube. A third end of the first guide portion can be inserted in a first end of the sleeve tube, and a fourth end of the second guide portion can be inserted in a second end of the sleeve tube. It can be seen in FIG. 2 that two sleeve tubes 343 of the device are connected to one another by means of a supporting member 9.

This supporting member 9 contains a stand which can rest on a surface to prevent guides 34 bending due to the weight of the planetary gear train's component parts, and in particular of the front and rear rings. Supporting member 9 can be positioned on the ground, is adjustable, and enables an operator to transfer the forces to prevent the assembly bending, and also to maintain alignment between the rings, the teeth and the planet-carrier.

Figure 3A:
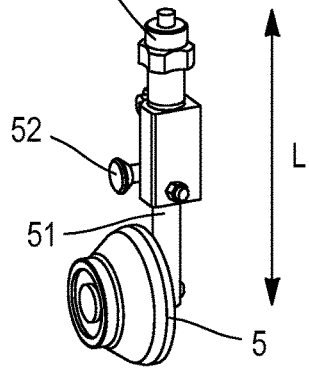
FIGS. 3A, 3B, 4A and 4B, diagrammatic views of means for holding and rotating a device for installing a ring of a train according to one embodiment of the invention.

FIG. 3A illustrates an adjustable roller 5 which can act as a first 412 or second 422 means for preventing the front or rear ring rotating around its axis. The adjustable roller contains a fastening pin 51 for fastening the roller to the front, or rear, bracket. Fastening pin 51 is of adjustable length L, and the length of the pin of the adjustable roller can be adjusted using knurled screw 53 on fastening pin 51. The adjustable roller also contains a ball lock pin 52 enabling the roller to be moved from the first/third position, illustrated in FIG. 4B, to the second/fourth position, illustrated in FIG. 4A. The lengths of the adjustable rollers are adjustable, in order that the positions of the front/rear rings relative to the axis of the planet-carrier can be adjusted.

Figure 3B:
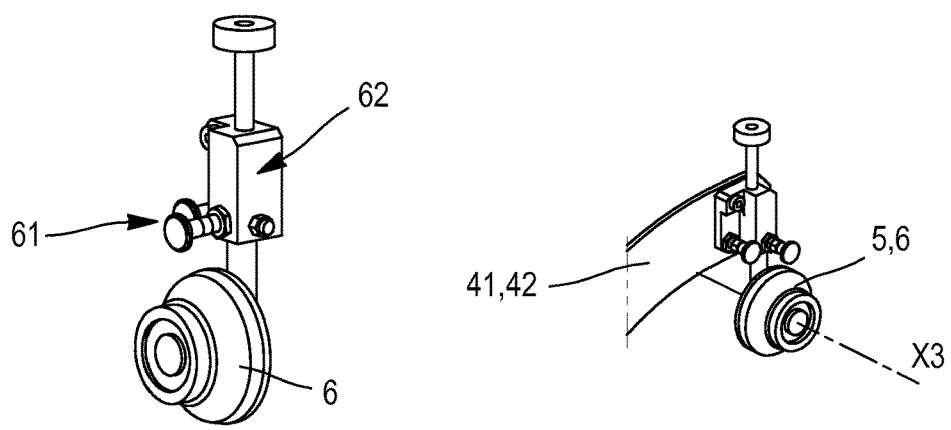

FIG. 3B illustrates a simple roller 6 which can act as a first 412 or second 422 means for preventing the front or rear ring rotating around its axis. Simple roller 6 also contains a ball lock pin 61 enabling the roller to be moved from the first/third position, illustrated in FIG. 4B, to the second/fourth position, illustrated in FIG. 4A. Simple roller 6 also contains a spring 62 enabling the simple roller to be pressed against the front/rear ring.

Figure 4A:
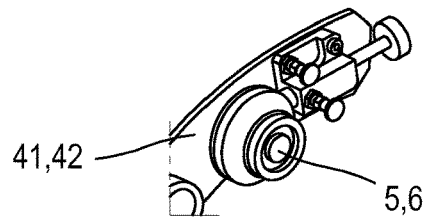

In the second/fourth position illustrated in FIG. 4A the adjustable/simple rollers are retracted relative to front/rear bracket 41, 42. The front/rear ring is thus not held in place by the retracted rollers.

Figure 4B:
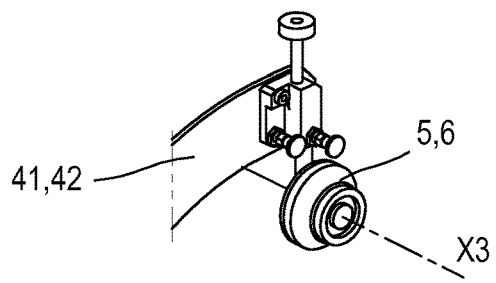

In the first/third position illustrated in FIG. 4B the adjustable/simple rollers are not retracted relative to front/rear bracket 41, 42. The front/rear ring is thus supported and therefore held in place by the non-retracted rollers. The rollers are also able to rotate around a third axis X3. In a non-retracted position the rollers therefore support the front/rear ring, and the latter can rotate around its axis due to the rotation of the rollers around their own axes.

Figure 5:
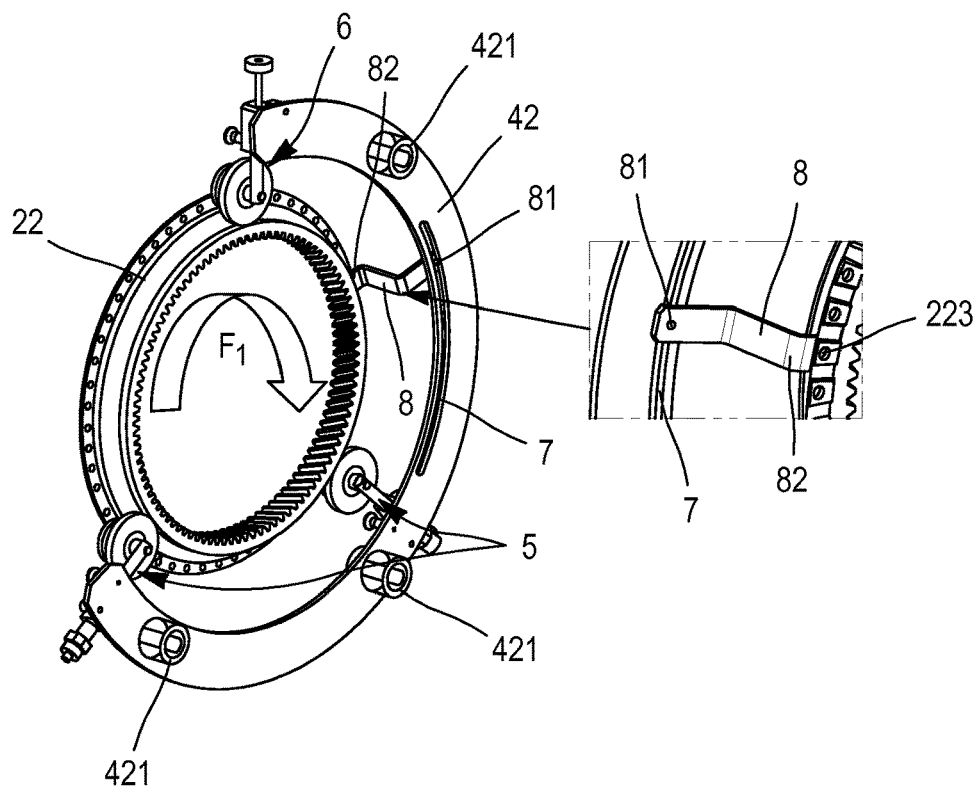
FIG. 5, a diagrammatic view of a rear ring and of a rear bracket of a device for installing a ring of a train according to one embodiment of the invention.

FIG. 5 illustrates rear ring 22 on its rear bracket 42. In this example embodiment rear bracket 42 contains three holes 421 where the guides can pass through, enabling rear bracket 42, and therefore the rear ring, to be moved along the said guides. The rear bracket also contains several second means for holding and rotating the rear ring around its axis in the direction of arrow F1. The second means contain two adjustable rollers 5, a simple roller 6, and a groove 7 and a retaining bracket 8. The operation and structure of the adjustable and simple rollers were described in reference to FIGS. 3A to 4B. The function of retaining bracket 8 and groove 7 is to make the position of the rear ring fast. Indeed, even if the rollers are machined to the rings' size and profile, there could still be a risk that the ring might jump from the rollers when the elements are being handled. Retaining bracket 8 contains a first end 81 which works in tandem with groove 7 and a second end 82 which works in tandem with the rear ring to hold the latter in place. First end 81 of bracket 8 is thus inserted in groove 7 and second end 82 can be screwed into a screw hole 223 of rear ring 22. Another function of groove 7 is to release the rear ring to rotate around its axis, in the direction of arrow F1. If only a retaining bracket were present, but without a groove, the rear ring would not rotate freely.

Figure 6:
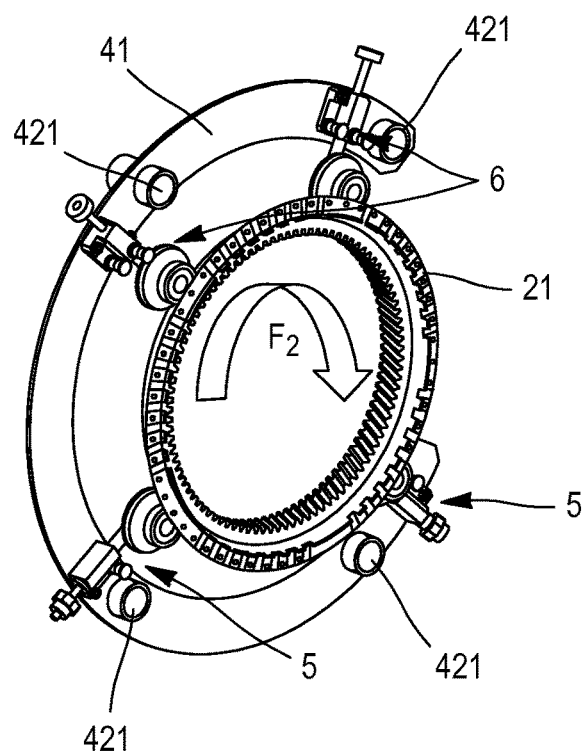
FIG. 6, a diagrammatic view of a front ring and of a front bracket of a device for installing a ring of a train according to one embodiment of the invention.

FIG. 6 illustrates front ring 21 on its front bracket 41. In this example embodiment front bracket 41 contains four holes 421 where the guides can pass through, enabling front bracket 41, and therefore the front ring, to be moved along the said guides. The front bracket also contains several first means for holding and rotating the front ring around its axis in the direction of arrow F2. The first means comprise two adjustable rollers 5 and two simple rollers 6. The operation and structure of the adjustable and simple rollers were described in reference to FIGS. 3A to 4B. Since front ring 21 is flanged by four rollers it is not necessary to add a groove and a retaining bracket to make its attachment fast.

Figure 7A:
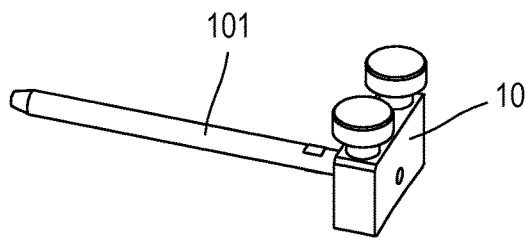
FIG. 7A, a diagrammatic view of a guide pin of a device for installing a ring of a train according to one embodiment of the invention.
Figure 7B:
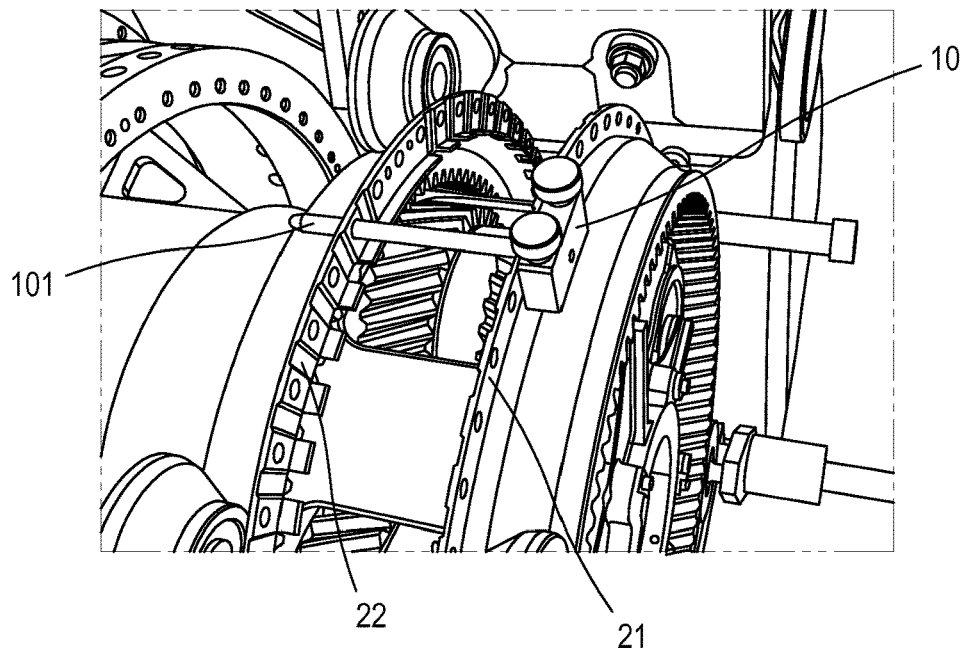
FIG. 7B, a diagrammatic view of a front ring, a rear ring and the guide pin of FIG. 7A.

FIG. 7A illustrates a guide pin 10 containing a longitudinal tube 101. Tube 101 of the guide pin is designed to pass through, as represented in FIG. 7B, screw holes of both front ring 21 and rear ring 22. To be able to make the teeth of each ring securely attached to one another, and to the planet gears, the front and rear rings have a mark on their periphery, where the mark of the front ring must be facing the mark of the rear ring. By inserting the guide pin an operator is able to bring the rings together whilst being sure that they are positioned correctly. When guide pin 10 has been inserted in the correct holes of both the front and rear rings, all the operator must then do is rotate one of the two rings, whether front or rear, since the holes are indexed relative to one another by means of pin 9. The operator will thus be able to rotate a single ring, which will also cause the second to rotate.

Figures 8A, 8B:
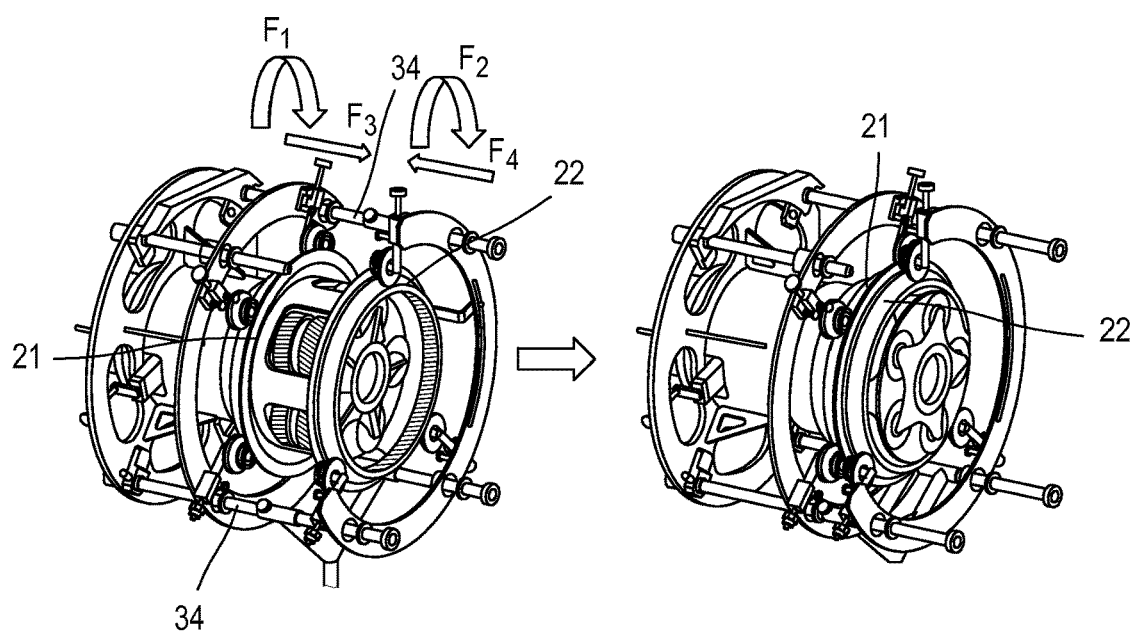
FIGS. 8A and 8B, diagrammatic views of a device for installing a ring of a train according to one embodiment of the invention in various positions.

FIG. 8A illustrates the way in which the ring of the planetary gear train is assembled by translation and rotation of the front ring 21 and rear ring 22.

Front ring 21 and rear ring 22 must be moved laterally towards one another and towards the teeth of the planet gears of the planet-carrier in the directions of arrows F3 and F4. Front ring 21 moves laterally along guides 34 in the direction of arrow F3, and rear ring 22 moves laterally along guides 34 in the direction of arrow F4. When contact has almost been made between the teeth of the front and rear rings a check must be made that the screw holes are facing one another, particularly those allowing alignment. The guide pin shown in FIGS. 7A and 7B is then used. Indeed, over the 360° rotation of the front and rear rings, only a single position is possible in which the teeth can be fitted. When the guide pin has been inserted between the guide holes of front ring 21 and rear ring 22 the operator has merely to rotate the front ring in the direction of arrow F1, or rotate the rear ring in the direction of arrow F2, to fit the teeth relative to one another and engage the ring formed in this manner with the planet gears as represented in FIG. 8B.

The invention is not limited to the embodiments described above with reference to the figures, and variants could be envisaged without going beyond the scope of the invention.

The invention claimed is:

1. A device for installing a ring of a planetary gear train, wherein the planetary gear train extends in a first axis, wherein the ring includes a front ring and a rear ring, the device comprising:
   a plurality of longitudinal guides, wherein each guide extends in a direction parallel to the first axis;
   a front bracket having the shape of an arc of a circle for supporting the front ring, wherein the front bracket contains:
      at least two holes allowing the guides to pass through;
      a plurality of first holding and rotation means for holding the front ring and for rotating it around its axis, wherein the plurality of first holding and rotation means comprise first retractable rollers which are moveable between a first position alongside a diameter of the front bracket, in which the front ring is held and rotatable around its axis, and a second position alongside the arc of the circle of the front bracket in which the front ring is not held in place;
   a rear bracket having the shape of an arc of a circle for supporting the rear ring, wherein the rear bracket contains:
      at least two holes allowing the guides to pass through;
      a plurality of second holding and rotation means for holding the rear ring and for rotating it around its axis, wherein the plurality of second holding and rotation means comprise second retractable rollers which are moveable between a third position alongside a diameter of the rear bracket, in which the rear ring is held and rotatable around its axis, and a fourth position alongside the arc of the circle of the rear bracket, in which the rear ring is not held in place,
   wherein the device facilitates an assembly of the front and the rear rings and their installation with planet gears of a planet-carrier.

2. The device according to claim 1, wherein the first retractable rollers comprises:
   two adjustable rollers, wherein each adjustable roller of the two adjustable rollers contains a pin to attach said adjustable roller to the front bracket, wherein a length of the pin is adjustable and wherein a ball lock pin of each adjustable roller enables said adjustable roller to be moved from the first position to the second position; and
   two simple rollers, wherein each simple roller of the two simple rollers contains a spring and a ball lock pin enabling said simple roller to move from the first position to the second position, wherein the spring of the simple roller is designed to press the simple roller against the front ring in the first position.

3. The device according to claim 1, wherein the second retractable rollers include:
   two adjustable rollers, wherein each adjustable roller of the two adjustable rollers contains a pin to attach said adjustable roller to the rear bracket, wherein the length of said pin is adjustable and wherein a ball lock pin of each adjustable roller enables said adjustable roller to be moved from the third position to the fourth position; and
   a simple roller, wherein the simple roller has a spring and a ball lock pin enabling the simple roller to be moved from the third position to the fourth position, and wherein the spring is designed to press the simple roller against the rear ring in the third position; and wherein the plurality of second holding and rotation means further include:
   a groove and a retaining bracket, wherein the retaining bracket contains a first end designed to work in tandem with the groove, wherein the first end is movable in the groove, and a second end designed to work in tandem with the rear ring to hold the rear ring in place.

4. The device according to claim 1, wherein at least two of the plurality of guides each include:
   a sleeve tube including a first end and a second end;
   a first guide portion, wherein a third end of the first guide portion is designed to be inserted in the first end of the sleeve tube;
   a second guide portion, wherein a fourth end of the second guide portion is designed to be inserted in the second end of the sleeve tube;
   wherein each sleeve tube is connected to the other sleeve tube by a support element, wherein the support element contains a stand designed to rest on a surface.

5. The device according to claim 1, further comprising a guide pin, wherein the guide pin contains a longitudinal tube configured to be inserted simultaneously through a first hole of the front ring and a second hole of the rear ring.

* * * * *